United States Patent
Peterzell

[11] Patent Number: 6,160,381
[45] Date of Patent: Dec. 12, 2000

[54] BATTERY PACK PROTECTION CIRCUIT AND BATTERY PACK INCLUDING A PROTECTION CIRCUIT

[75] Inventor: Paul E. Peterzell, San Diego, Calif.

[73] Assignee: Qualcomm Inc., San Diego, Calif.

[21] Appl. No.: 09/166,414

[22] Filed: Oct. 5, 1998

Related U.S. Application Data

[63] Continuation-in-part of application No. 09/082,512, May 21, 1998.

[51] Int. Cl.[7] .................................................. H01M 10/46
[52] U.S. Cl. .............................................. 320/134; 320/136
[58] Field of Search .................................. 320/127, 128, 320/134, 136

[56] References Cited

U.S. PATENT DOCUMENTS

| | | |
|---|---|---|
| 3,686,530 | 8/1972 | BoGut . |
| 5,539,299 | 7/1996 | Fernandez et al. . |
| 5,554,919 | 9/1996 | Uchida . |
| 5,617,010 | 4/1997 | Higashijima et al. . |
| 5,729,061 | 3/1998 | Narita . |

*Primary Examiner*—Edward H. Tso
*Attorney, Agent, or Firm*—Phillip Wadsworth; Charles D. Brown

[57] ABSTRACT

A battery protection circuit for an external battery pack has a switch for controlling connection of a battery output to a load and a detector for detecting a resistance at a load output terminal. A first comparator compares the detected resistance to a predetermined maximum value, and a second comparator compares the detected resistance to a predetermined minimum value. If the detected resistance is in the range between the minimum and maximum values, a control signal is produced to enable connection of the battery output to the load. If the detected resistance is outside the range, the switch is disabled and no current can flow to the load.

28 Claims, 4 Drawing Sheets

BATTERY PACK PROTECTION CIRCUIT AND BATTERY PACK INCLUDING A PROTECTION CIRCUIT

CROSS-REFERENCES TO RELATED APPLICATIONS

This application is a Continuation-In-Part of application Ser. No. 09/082,512, filed May 21, 1998.

BACKGROUND OF THE INVENTION

The present invention relates generally to portable phones and other electronic devices employing an external battery pack to provide power, and is particularly concerned with a protection circuit for preventing accidental short circuits of the exposed contacts of an external battery pack when disconnected from the phone or charging unit.

The back of a portable phone typically has spring-loaded contacts for mating engagement with flush contacts of an external battery pack when releasably secured to the phone. Various types of releasable fastening devices are used to secure such battery packs to portable phones. The battery pack fits into a charging unit with similar spring-loaded contacts when re-charging is required.

One problem with such external battery packs is that they may be accidentally short circuited by the user when not connected to the phone or charging unit. Most such battery packs, such as Li-ion battery packs, for example, have built in self protection circuitry for preventing overcharge or over discharge of the battery pack. However, when spare battery packs are carried loose in a user's bag, pocket, or purse, an accidental short circuit may occur where loose coins or keys connect the positive and negative exposed contacts. Such a situation may not activate the built in self protection circuit, since the thresholds for such short circuits must be higher than the operating discharge current under normal conditions, i.e. if the device draws peak currents at 1 amp, then the self-protection circuit of the battery pack must trip at currents above 1 amp. This will not activate the current self protection circuit provided in such battery packs.

SUMMARY OF THE INVENTION

It is an object of the present invention to provide a new and improved protection circuit for an external battery pack, particularly a portable phone battery pack.

According to the present invention, a battery protection circuit is provided, which comprises a switch assembly having an input for receiving a control signal, the switch assembly controlling connection of a battery output to a load, a detector for detecting a resistance at a load terminal, and a control assembly for determining whether the resistance has a value between a predetermined maximum value and a predetermined minimum value, and for generating the control signal in response to the determination, the control signal causing the switch to close if the determination is positive, and causing the switch to open otherwise, so that the battery output is connected to the load only when the detected resistance has a value between the predetermined minimum and maximum values.

Preferably, the control assembly comprises a first comparator for comparing the resistance to the predetermined maximum value and producing a first output signal if the resistance is above the predetermined maximum value and a second output signal if the resistance is below the predetermined maximum value, a second comparator for comparing the resistance to the predetermined minimum value and for producing a third output signal if the resistance is below the predetermined minimum value and a fourth output signal if the resistance is above the predetermined minimum value, and a second detector connected to the outputs of the first and second comparators for producing the control signal to close the switch if the resistance is between the minimum and maximum values.

Preferably, the load to be powered by the battery has positive and negative input contacts for connection to battery positive and negative outputs, respectively, and an ID output to which a predetermined load identifying resistance is applied. When the battery is connected through the battery protection circuit to the proper load, the ID output is connected to the first and second comparators which compare its resistance to the predetermined minimum and maximum values, and only permit power to be supplied from the battery to the load when the detected resistance is between the minimum and maximum values.

In a preferred embodiment of the invention, the circuit also includes a self-protection control unit for controlling discharge of the battery, the control unit having an input, an overdischarge output, and the switch assembly includes a first switch controlling series connection of the battery to a load in a discharge mode, the first switch having a control input connected to the overdischarge output of the control unit, and a second switch for disabling the first switch if the load ID resistance is detected to be outside the predetermined range between the minimum and maximum values. The second switch may be arranged to control the power input to the control unit, so as to disable the control unit itself when the detected resistance is outside the predetermined range, or may be connected between the overdischarge output of the control unit and the first switch to disable the control input to the switch in the event that the detected resistance is outside the predetermined range.

The control unit may also have an overcharge output, and a third switch for controlling charging of the battery is series connected between a charge input and a battery input, the third switch having a control input connected to the overcharge output. The control unit is arranged to open the third switch when the battery has been charged to a predetermined value. A fourth switch, also controlled by the output from the second detector, may be connected between the overcharge output and the third switch, so that the battery cannot be charged or discharged where the detected ID resistance is outside the predetermined range.

Alternatively, the function of the self-protection control unit may be kept completely separate from that of the switch assembly. In such an alternative embodiment, an additional switch is provided to control series connection of the battery to a load independent from the first switch and self protection control unit. The additional switch is responsive to the control signal from the control assembly to open if the detected resistance is outside the predetermined range.

The battery protection circuit will prevent the battery from being accidentally shorted out by metallic objects such as keys, coins or the like when not in use. Discharge is only possible when the circuit detects connection to a load having the proper ID resistance.

BRIEF DESCRIPTION OF THE DRAWINGS

The present invention will be better understood from the following detailed description of some preferred embodiments of the invention, taken in conjunction with the accompanying drawings in which like reference numerals refer to like parts and in which.

DESCRIPTION OF THE PREFERRED EMBODIMENTS

Figure 1:
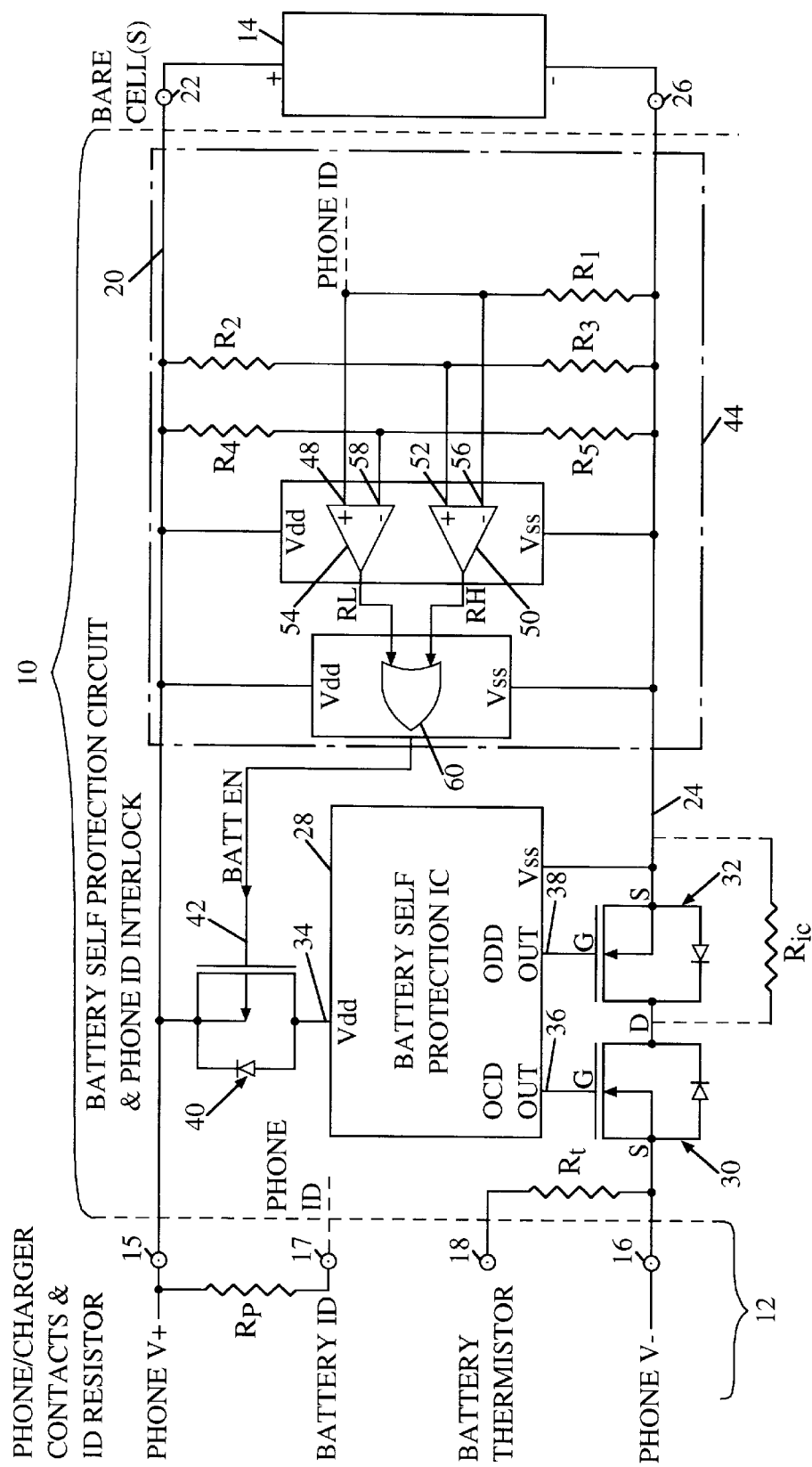
FIG. 1 illustrates a battery protection circuit according to a first embodiment of the invention.

FIG. 1 illustrates a battery protection circuit 10 according to a first embodiment of the present invention connected between a load 12 such as a portable phone or battery charger and the battery cell 14 of an external battery pack of the type normally used to power portable phones and other electronic devices such as video game units and the like. The outer housing of the battery pack has a series of exposed contacts 15, 16, 17, 18 comprising a positive input terminal V+, a negative input terminal V−, an ID terminal, and a thermistor terminal, respectively. A set of flush contacts will be provided on the phone and the charger unit, so that the battery pack may be releasably connected to the portable phone or charger unit as required.

Circuit 10 includes a first connecting line 20 between V+ contact 15 and the positive battery output 22, and a second connecting line 24 between V− contact 16 and the negative battery terminal 26. In both the phone and the charger unit, a predetermined ID resistance is provided at a phone or charger ID terminal 17 by connecting resistor Rp between the V+ contact 15 and the exposed ID contact 17 of the phone and charger unit. The circuit 10 is arranged to prevent discharge of the battery 14 unless the detected resistance is in the range between a predetermined minimum of Rp−D and a predetermined maximum of Rp+D, where D is determined according to normal variations in the value of the phone, charger, and battery pack resistances.

A battery temperature resistance or thermistor Rt is connected between contact 18 and line 24. Many battery packs for portable phones, portable electronics units, and the like already have a built-in self protection IC 28 and a pair of switches 30, 32 in line 24 for controlling charging and discharging, respectively, of the battery or cell 14, which may be an Li-ion cell or the like. However, in the prior art arrangements, line 20 is connected directly to the power input 34 of the Ic 28. Switches 30, 32 are preferably FETs. IC 28 has an overcharge (OCD) output 36 connected to the gate of switch 30 to open the switch and prevent any further charging if the voltage of the battery is outside safe limits. An overdischarge (ODD) output 38 of IC 28 is connected to the gate of FET 32 to open the switch and prevent discharging of the battery if the current or voltae exceeds safe limits. The normal operation of a self-protection IC of this type as normally provided in external battery packs is to allow FETs 30 and 32 to enable charge and discharge of the battery pack when the current and voltage of the battery are within safe limits, as will be understood by those skilled in the field.

The prior art arrangement as discussed above does not prevent accidental battery discharge in the event that some metal object causes a short across battery pack contacts 15 and 16. The circuit in the embodiment of FIG. 1 additionally provides protection against such accidental battery discharge. In this embodiment, a third switch 40 is connected between power line 20 and the power input 34. This switch is responsive to a battery enable input 42 from a phone/charger identification system 44 so that the IC 28 is only switched on when the system 44 detects connection to a load such as a portable phone or charge unit having an ID resistance Rp within the predetermined range, as will be explained in more detail below. Switch 40 is preferably also an FET.

The phone identification circuit 44 has a phone ID input 46 which is connected to phone ID terminal 17 at which the resistance Rp should be present if the battery pack is connected to a portable phone or charger input. The phone or charger ID resistor Rp then forms a voltage divider circuit with a resistor R1, and the divided voltage is provided as a first input 56 to an upper limit comparator 50 and a first input 48 to a lower limit comparator 54. A first voltage divider circuit comprising resistors R2 and R3 sets an upper limit voltage (Rp+D) and provides a second input 52 to upper limit comparator 50. A second voltage divider circuit comprising resistors R4 and R5 sets a lower limit voltage (Rp−D) and provides a second input 58 to lower limit comparator 54. The outputs RH, RL of comparators 50 and 54 are provided as inputs to an OR gate circuit 60, which in turn provides the battery enable input or control signal 42 to the gate of FET 40.

The limits Rp +/− D are set by adjusting resistors R1 to R5, $R_{ic}$ and Rp in the phone and charger unit. These resistors should be set as high as possible, while maintaining the necessary accuracy on the maximum and minimum threshold values, or excessive current will be drawn from the battery continuously. The voltage divider circuits may alternatively be replaced with two voltage references, but the cost of this alternative will be higher than using R2–R5 and the current may also be higher, depending on the reference chosen.

The following logic or truth table provides the possible states of OR gate 60, where Rd is the detected resistor value at terminal 17:

| Resistor value | RH | RL | BATT. EN. | COMMENTS |
|---|---|---|---|---|
| Rd ≦ Rp − D | 0 | 1 | 1 | Detected resistance below low value threshold. FET 40 open, IC 28 off. |
| Rp − D < Rd < Rp + D | 0 | 0 | 0 | Detected resistance is in range. FET 40 closed and battery pack enabled. |
| Rd ≧ Rp + D | 1 | 0 | 1 | Detected resistance above high value threshold. FET 40 open, IC 28 off. |

From the foregoing table, it can be seen that, unless the detected resistance at input 46 is between the low (Rp−D) and high (Rp+D) resistance limits, the IC 28 which controls the series charge/discharge FETs 30, 32 is disabled. Since the IC 28 is disabled, both series FETs 30 and 32 are turned off and the battery cannot be discharged nor charged.

If the voltage across R1 falls between the high and low limits, the output from OR circuit 60 will produce a voltage on the battery enable input 42 which closes FET 40, thereby activating IC 28. This closes FETs 30 and 32, allowing current (voltage) to appear at the external negative terminal or contact 16 of the battery pack.

When the battery pack is not mated to a phone or charger unit, Rp will be infinite, and virtually no voltage will appear across R1. Thus, the voltage on R1 will be outside the range and IC 28 will not be activated. FETs 30 and 32 will remain open, and little or no current can flow from the battery. Thus, the battery cannot be short circuited.

The embodiment of FIG. 1 may be used with any battery self protection IC 28 which does not have to be powered on at all times. However, the battery pack overcharge/ overdischarge protection ICs made by some manufacturers require that the supply voltage to the IC remain above a prescribed voltage, or the IC will not function correctly after power is restored. The battery self-protection IC of these manufacturers has a latch which prevents turning on of the IC after power is restored unless a predetermined voltage is seen. Thus, the circuit of FIG. 1 cannot be used with self-protection ICs having a built-in latch, and the circuit of FIG. 2 or FIG. 3 may be used in such cases.

Figure 2:
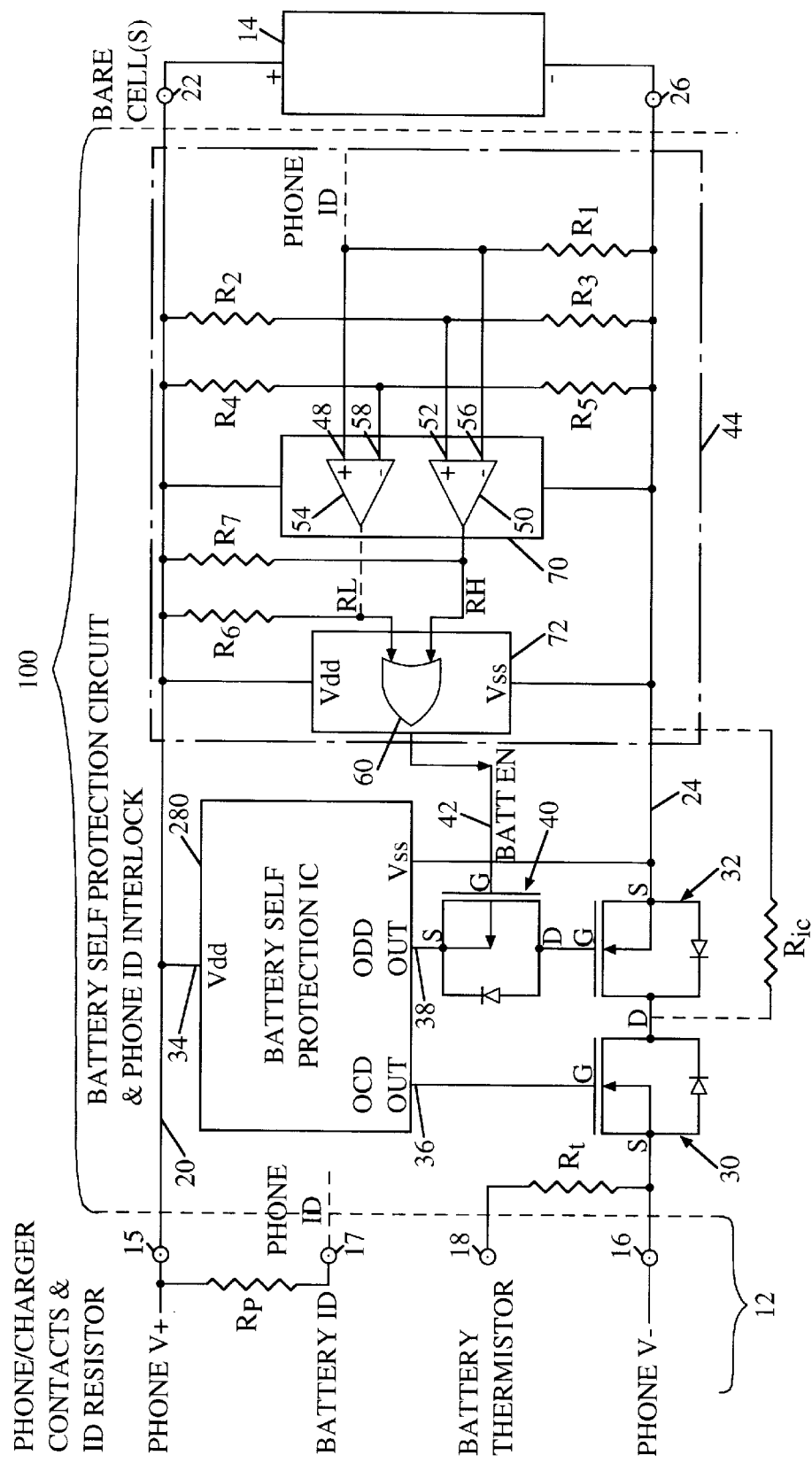
FIG. 2 illustrates a modified battery protection circuit.

FIG. 2 illustrates a modified battery protection circuit 100 which may be used with battery self protection ICs 280 which have built-in latches and must be powered at all times. Apart from this requirement, IC 280 of FIG. 2 functions in a similar manner to the IC 28 of FIG. 1. A number of components in FIG. 2 are identical to those in FIG. 1, and like reference numerals have been used for like components as appropriate.

In this embodiment, the third switch or FET 40 is illustrated between the ODD output 38 of IC 280 and the gate of the second FET 32. As in the previous embodiment, a battery enable output 42 of the battery identification circuit 44 is provided as a control input at the gate of FET 40. The logic table for this embodiment is as follows:

| Resistor value | RH | RL | BATT. EN. | COMMENTS |
| --- | --- | --- | --- | --- |
| Rd ≤ Rp − D | 0 | 1 | 1 | Detected resistance below low value threshold. FET 40 open, FET 32 disabled. Normal discharge disabled. |
| Rp − D < Rd < Rp + D | 0 | 0 | 0 | Detected resistance is in range. FET 40 closed and FET 32 enabled. Battery +/− and discharge enabled. |
| Rd ≥ Rp + D | 1 | 0 | 1 | Detected resistance above high value threshold. FET 40 open, FET 32 disabled. Normal discharge disabled. |

With this arrangement, the IC 280 is never powered down, but the discharge FET 32 is disabled when the battery pack is not connected to resistance Rp within the predetermined range. This approach is not as advantageous as that of FIG. 1, since the self-protection IC 280 is always on and drawing current, but it may be used in all cases where the IC must be powered on at all times.

The embodiment of FIG. 2 allows the battery pack to be charged if the charging voltage is within safe limits, whether or not the correct ID resistance Rp is present, but discharge is only allowed when the battery is connected to the phone or other predetermined load or to a charge unit. In contrast, the embodiment of FIG. 1 does not allow charge or discharge unless the detected resistance Rp is within the predetermined range. The embodiment of FIG. 2 has an advantage over that of FIG. 1 in certain conditions. If an abnormal event occurs such that the battery voltage is below normal operating range, it is possible to charge the battery even when the battery identification circuit is inoperative. In this situation, it is possible to charge the cell through the parasitic diode across the source-drain connection of FET 30.

In one specific example of a battery protection circuit as illustrated in FIG. 2, the battery self-protection IC 280 was an RM127C made by Ricoh Corporation. Dual comparators 50, 54 were embodied in an IC 70, in this case a MAX966EUA made by Maxim Corporation. The OR gate 60 was provided by IC 72, in this example a TC7SL32FU made by Toshiba corporation. These ICs require additional resistors R6 and R7, as indicated in FIG. 2. Since some comparator' outputs are open drain, it is also possible to remove R7 and IC72 and tie the comparators' outputs together to create the AND of the individual comparators in IC70. The resistance Rp is selected based on the nominal resistance value provided by the phone. In one particular example, Rp was nominally 130 Kohm, and D was selected to be 6%. However, it will be understood that other resistance values may be used based on the battery pack and phone to be used. In this specific example, the following resistance values were used in the protection circuit:

R1: 150 kohm;
R2: 1.5 Mohm;
R3: 0.5 Mohm;
R4: 0.5 Mohm;
R5: 1.5 Mohm;
R6: 510 kohm;
R7: 510 kohm;
$R_{pi}$: 130 kohm It will be understood that the foregoing values are given by way of example only, and that other components with equivalent functions and other nominal resistance values may be used in order to meet the requirement of determining if the correct ID resistance is present, within predetermined limits.

Figure 3:
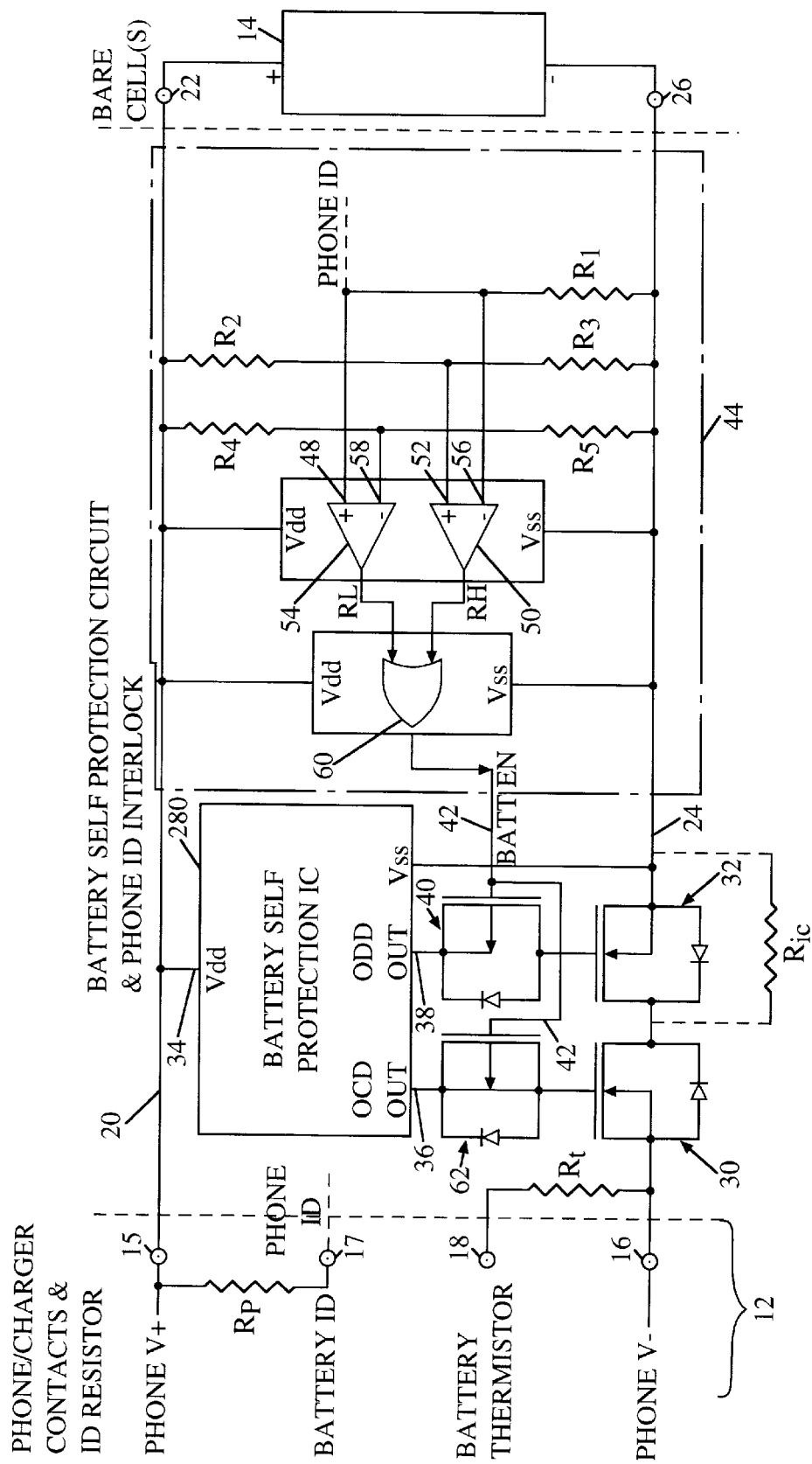
FIG. 3 illustrates another modified battery protection circuit.

FIG. 3 illustrates another embodiment which is functionally more similar to that of FIG. 1 but which allows a self-protection IC 280 to be powered on at all times. Again, like reference numerals have been used for like parts in this embodiment.

This embodiment is similar to that of FIG. 2, with FET 40 connected between ODD output 38 of the IC 280 and the gate of discharge FET 32. However, in this embodiment, a fourth switch or FEt 62 is connected between the OCD output 36 of IC 280 and the gate of charge FET 30. The battery enable output 42 of the load or phone identification circuit 44 is connected to the gates of both FETs 40 and 62, so that both the charge and discharge FETs 30 and 32 are disabled if the detected resistance is outside the predetermined range. The logic table for this embodiment is as follows:

| Resistor value | RH | RL | BATT. EN. | COMMENTS |
| --- | --- | --- | --- | --- |
| Rd ≤ Rp − D | 0 | 1 | 1 | Detected resistance below low value threshold. FETs 40 and 62 open, normal discharge and charge disabled. |
| Rp − D < Rd < Rp + D | 0 | 0 | 0 | Detected resistance is in range. FET 40 and 62 closed and battery pack enabled |
| Rd ≥ Rp + D | 1 | 0 | 1 | Detected resistance above high value threshold. FETs 40 and 62 open, normal discharge and charge disabled. |

The embodiment of FIG. 3, like that of FIG. 1, shuts off both the charge FET 30 and the discharge FET 32 when the detected resistance Rp is outside predetermined limits. If resistance Rp is within predetermined limits, the ODD and OCD output pins of IC 280 operate in the normal manner to enable discharge and charge of the battery pack when the current and voltage of the battery are within safe limits.

Figure 4:
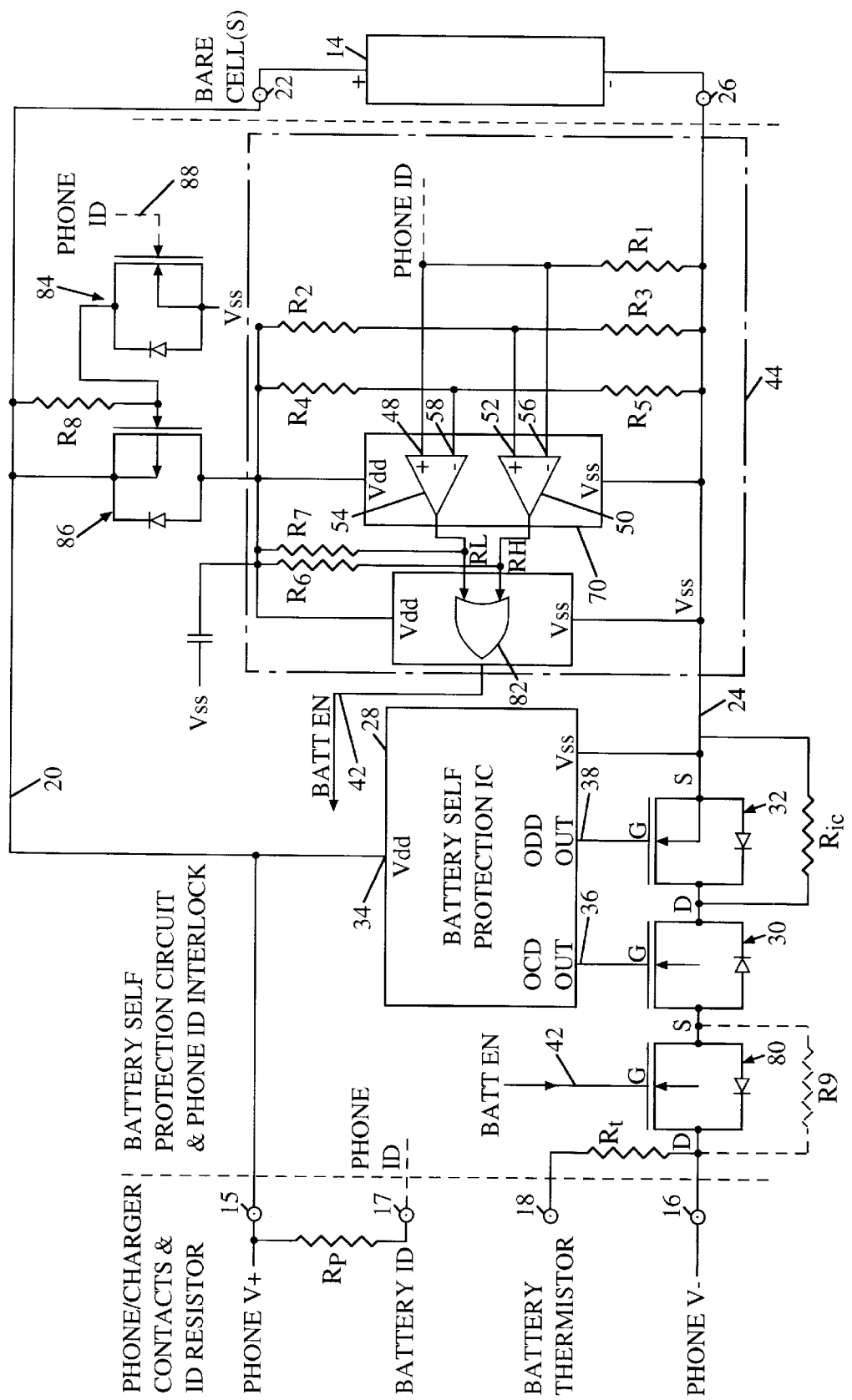
FIG. 4 illustrates a battery protection circuit according to another embodiment of the invention.

In the embodiments of FIGS. 1 to 3, the protection circuit operates in conjunction with the battery pack self-protection circuitry, specifically the battery self protection IC 28 or 280 and the charge and discharge FETs 30 and 32, respectively. However, it has been found that, in many cases, the function of the interlock or battery protection circuit is best separated from the self-protection functions of the IC 28 or 280. In some cases, with circuits arranged as in FIGS. 1 to 3, the self-protection IC may falsely detect an over-current condition if the interlock or protection circuit overrides the control of FET 32 or if the Vdd input to the self-protection IC is turned on or off by the interlock or protection circuit. FIG. 4 illustrates another embodiment of the invention in which this potential problem is overcome. Again, like reference numerals have been used for like parts in this embodiment. In the embodiment of FIG. 4, the problem of potential improper function of the self-protection IC 28 has been overcome by adding a third FET 80 in series with FET 30 and 32, and connecting the battery enable output 42 from phone identification circuit 44 to the gate of FET 80. FET 80 is preferably an n-channel power FET.

The phone identification or interlock circuit 44 of FIG. 4 is similar to that of the previous embodiments, except that OR gate 60 of the previous embodiments is replaced by an AND gate 82, and the positive and negative inputs to the two comparators 50 and 54 in IC 70 are reversed, to allow interlock circuit 44 to control an n-channel FET instead of the p-channel FET used in the previous embodiments. The phone ID input 46 to circuit 44 is connected to phone ID terminal 17 at which the resistance Rp should be present when a phone or charger unit is properly connected to the protection circuit. The input 46 is connected to positive and negative inputs, respectively, of comparators 50 and 54. As in the previous embodiments, a first voltage divider circuit R2, R3 sets an upper limit voltage (Rp+D) and is provided as a second input 52 to the upper limit comparator 50. A second voltage divider circuit R4, R5 sets a lower limit voltage (Rp−D) and provides a second input 58 to the lower limit comparator 54. The outputs RH and RL of comparators 50 and 54 are then provided as inputs to AND gate 82, which in turn provides the battery enable signal 42 to the gate of FET 80.

The circuit of FIG. 4 also includes two additional FETs 84 and 86 which are used to disable the interlock circuit 44 until the battery pack is connected to a phone or charger which provides a threshold at the phone ID input 88 which is high enough to enable FET 84. FET 86 has a control output 90 connected to the power inputs of the IC 70 and AND gate 80, so that if the gate-source voltage of FET 86 is zero, the interlock circuit 44 will be turned off and the battery pack outputs will be disabled. When a phone ID resistance is present, FET 84 is turned on, which in turn switches on FET 86, providing power to the power inputs of the interlock circuit components 70 and 80 so that they operate to determine whether the resistance is in the required range. This arrangement allows the circuit to power down when not needed, reducing power consumption.

$R_{ic}$ allows the ID voltage to be validly measured by the phone so that the phone will recognize that the battery is present, is overly discharged, and permit it to be recharged. $R_{ic}$ is set to a low enough value to not significantly influence the measurement of the ID resistor, and must also have a value high enough to limit the current flow if FET 32 is open. A similar $R_{ic}$ could of course be used in the circuits of FIGS. 1–3 where $R_{ic}$ is shown connected to the circuits by broken lines.

Optionally, a resistor R9 may be connected across the drain-source of FET 80, as indicated in dotted outline in FIG. 4. Resistor R9 allows the phone to enable and disable the battery pack by switching Rp in and out of the circuit with a transistor. Resistor R9 allows a small amount of current to flow from the battery to a circuit within the phone which enables and disables the connection of Rp between the ID and V+ pins of the battery pack. Resistor R9 provides a ground reference between the battery pack and the phone for this function. The addition of resistor R9 will keep current consumption to a minimum when the phone is turned off with the battery pack attached to the phone.

The following logic or truth table provides the possible states of AND gate 82, where Rd is the detected resistor value at the input 46 of the interlock circuit 44 and Rp is the expected phone or charger ID resistance:

| Resistor value | RH | RL | BATT. EN. | COMMENTS |
|---|---|---|---|---|
| Rd ≤ Rp − D | 1 | 0 | 0 | Phone ID resistor less than low value threshold, normal pack outputs disabled (FET 80 gate-source = 0). |
| Rp − D < Rd < Rp + D | 1 | 1 | 1 | Detected resistance is in range. Pack enabled. FET 80 gate-source = battery voltage. |
| Rd ≥ Rp + D | 0 | 1 | 0 | Phone ID resistance detected greater than high value threshold, normal pack outputs disabled (FET 80 gate-source = 0). |
| Rp not present | 0 | 0 | 0 | Interlock circuit 44 turned off by FETs 84 and 86, normal pack outputs disabled, FET 80 gate-source = 0. |

From the foregoing table, it can be seen that, unless the detected resistance at input 46 is between the low and high resistance limits or thresholds, FET 80 will be off and the battery pack outputs will be disabled. If the detected resistance falls within the range between the low and high thresholds, FET 80 will be on or closed, enabling the battery voltage to appear at the battery pack outputs. When no phone or charger ID is present, the interlock circuit 44 is powered down by FETs 84 and 86.

In one specific example of a battery protection circuit as illustrated in FIG. 4, IC 70 was a MAX966EUA made by Maxim Corporation, and AND gate 82 was a Toshiba TC7SL08FU AND gate. FETs 30, 32 and 80 were N-channel power FETs, while FETs 84 and 86 were Toshiba 2SK2825 and 2SJ347 FETs, respectively. The resistor values were as follows:

R1—150 Kohm
R2—1.5 Mohm
R3—0.5 Mohm
R4—1.5–1.74 Mohm
R5—1.5 Mohm
R6—510 kohm
R7—150 kohm
R8—510 kohm
R9—100 kohm
$R_{ic}$—10 kohm.

It will be understood that the foregoing values are given by way of example only, and that other components with equivalent functions and other nominal resistance values may be used in order to meet the requirement of determining if the correct ID resistance is present, within predetermined limits.

The embodiment of FIG. 4 allows the interlock or detector circuit 44 and switch 80 to operate completely independently from the self-protection features of IC 28, avoiding the risk of detection of false over-current conditions by IC 28. This circuit also has the ability to power down when not needed, due to FETs 84 and 86 which only switch on the interlock circuit 44 if a phone or charger is present. The use of additional resistor R9 further reduces power consumption by disabling the battery pack if the phone connected to the battery pack is switched off.

In each of the above embodiments, in addition to providing normal discharge and charge controls based on the current, voltage, and temperature of the battery pack, the protection circuit will additionally permit battery discharge only when the battery pack is detected to be connected to an output load such as a portable phone or charger unit having an ID resistance Rp within a predetermined range. This prevents high discharge rates of the battery as a result of an accidental short circuit across battery contacts 15 and 16. If the circuit is open and no load is connected, the detected resistance Rd will be infinite, i.e. above the predetermined maximum value. If a short circuit occurs, the detected resistance will be zero, i.e. below the predetermined minimum value. Thus, normal discharge can only occur when the battery pack is mated to the portable phone, charger unit, or other electronic device with which it is intended to be used.

It will be noted that each of the FETs in FIGS. 1 to 4 have a parasitic diode connected across the source-drain connection. FETs 40 and 62 of FIGS. 1 to 3 may be replaced by PNP transistors or other electronic switching devices, but the p-channel FET as illustrated in the drawings provides the lowest voltage drop for this application and is preferred. Similarly, FETs 30 and 32 may be replaced by other electronic switching devices, although n-channel FETs are preferable since they also provide the lowest possible voltage drop. FETs 84 and 86 of FIG. 4 may be replaced with bipolar (NPN and PNP) transistors or other electronic switching methods, although the illustrated FETs provide the lowest voltage drop for this application. FETs 30, 32 and 80 of FIG. 4 may also be replaced by other electronic switching methods, although FETs provide the lowest voltage drop.

With the above protection circuits, it will be possible for a phone/charger to differentiate between a broken battery pack and no battery pack connected. When a battery pack is connected, the ID voltage will equal:

$$R1/(R1+Rp)*(V\pm V-)$$

under normal conditions, and will be undefined if no external battery is present or if the protection circuit is disabling the battery pack connection (i.e. if the charged voltage exceeds safe limits). The phone/charger may be arranged to measure the resistance between the V− pin and the thermistor terminal 18 directly connected to the battery pack, or indirectly by changing the voltage divider to a fixed voltage reference. The phone/charger can then differentiate between a broken external battery pack protection circuit and no battery connected according to the following logic or truth table:

| Battery ID Pin Voltage | Battery TEMP Resistance | Battery State to Phone/Charger |
|---|---|---|
| Valid Range | Valid Range | Connected and functional |
| Valid Range | Invalid Range | Connected and out of operating temp /range |
| Invalid Range | Valid Range | Connected and non-functional if steady state. |
| Invalid Range | Invalid Range | No battery connected. |

During normal engagement, the battery pack will first see a 130 kohm resistor between the ID and V+ pins, after the interlock circuitry is powered up. The time period for enabling the battery pack output pins (V+ and V−) will not be noticeable to the user. Once the phone senses that V+ and V− are enabled, the phone will then switch over to the external battery pack for discharge if the external battery is within operating limits. If not, the phone will continue to discharge from the internal battery. If the phone is in charge mode, the external battery charging will only commence after the external phone senses V+ and V− are enabled.

The battery pack protection circuits described above therefore prevent accidental short circuit of exposed battery pack contacts, for example when a battery pack is carried loose in a purse, bag, or packet while not in use. The circuit does not allow the exposed battery contacts on the battery pack to be active until it is determined that the battery pack is mated to the phone or charger unit.

Although a preferred embodiment of the invention has been described above by way of example only, it will be understood by those skilled in the field that modifications may be made to the disclosed embodiments without departing from the scope of the invention, which is defined by the appended claims.

I claim:

1. A battery protection circuit, comprising
   a switch assembly for controlling connection of a battery output to a load;
   a detector for detecting a resistance at a load terminal;
   a first comparator for comparing the detected resistance to a predetermined maximum value and producing a first output signal if the resistance is above said predetermined maximum value and a second output signal if the resistance is below the predetermined maximum value;
   a second comparator for comparing the detected resistance to a predetermined minimum value and for producing a third output signal if the resistance is below the predetermined minimum value and a fourth output signal if the resistance is above the predetermined minimum value; and
   a second detector connected to the outputs of the first and second comparators for producing a control signal to close the switch assembly if the detected resistance is in a predetermined range between the minimum and maximum values and to open the switch assembly if the resistance is outside said predetermined range, whereby the battery is connected to the load only when the detected load resistance is between the predetermined minimum and maximum values.

2. The circuit as claimed in claim 1, including a self-protection control unit for controlling discharge of the battery, the control unit having an input, an overdischarge output, and the switch assembly includes a first switch controlling series connection of the battery to a load in a discharge mode, the first switch having a control input connected to the overdischarge output of the control unit, and a second switch for disabling the first switch if the load ID resistance is detected to be outside the predetermined range between the minimum and maximum values.

3. The circuit as claimed in claim 2, wherein the self-protection control unit has a power input and the second switch is located to control the power input to the control unit, so as to turn off the control unit when the detected resistance is outside the predetermined range.

4. The circuit as claimed in claim 2, wherein the second switch is connected between the overdischarge output of the control unit and the first switch to disable the control input to the switch in the event that the detected resistance is outside the predetermined range.

5. The circuit as claimed in claim 2, wherein the control unit has an overcharge output, and a third switch for controlling charging of the battery is series connected between a charge input and a battery input, the third switch having a control input connected to the overcharge output.

6. The circuit as claimed in claim 5, wherein a fourth switch is connected between the overcharge output and the third switch for disabling the third switch if the detected resistance is outside the predetermined range.

7. The circuit as claimed in claim 1, including a self-protection control unit for controlling discharge of the battery, the control unit having an input, an overdischarge output, and an overdischarge switch controlling series connection of the battery to a load, the overdischarge switch having a control input connected to the overdischarge output of the control unit, and the switch assembly comprising an interlock switch connected in series with the overdischarge switch and responsive to said control signal to open if the detected resistance is outside the predetermined range.

8. The circuit as claimed in claim 7, wherein the interlock switch comprises an FET having a gate, a source, and a drain, the control signal being connected to the gate.

9. The circuit as claimed in claim 8, including a resistor connected across the source and drain of the FET.

10. The circuit as claimed in claim 8, wherein the FET is an n-channel power FET.

11. The circuit as claimed in claim 1, wherein the comparators and second detector each have a power input, the circuit including a second switch assembly for detecting a resistance at a load terminal and controlling power input to the comparators and second detector in response to a detected resistance, whereby the comparators and detector are disabled if no resistance is present.

12. The circuit as claimed in claim 2, wherein the first switch comprises an n-channel FET.

13. The circuit as claimed in claim 2, wherein the second switch comprises an FET.

14. The circuit as claimed in claim 13, wherein the second switch comprises a p-channel FET.

15. The circuit as claimed in claim 1, wherein the first and second comparators each have first and second inputs, the first input of each comparator being connected to said detected resistance, the circuit further including a first voltage reference connected to the second input of the first comparator and a second voltage reference connected to the second input of the second comparator.

16. The circuit as claimed in claim 15, wherein the first and second references each comprise voltage divider circuits.

17. The circuit as claimed in claim 15, wherein the second detector comprises an OR gate.

18. An external battery pack for connection to an electronic unit or charger, the battery pack comprising:

a battery cell having a positive terminal and a negative terminal;

at least three external contacts on the battery pack for mating with corresponding contacts on an electronic unit or charger when mated to the battery pack;

a first of said external contacts being connected to the positive terminal of the battery pack;

a second of said external contacts being connected to the negative terminal of the battery cell;

a third of said external contacts comprising an ID contact for connection to a predetermined ID resistance in an electronic unit or charger;

a first switch between said second external contact and battery terminal for controlling discharge of said battery;

a voltage divider circuit connected to said third external contact for producing an ID voltage dependent on the resistance at said third external contact;

a first reference voltage defining a predetermined maximum value;

a second reference voltage defining a predetermined minimum value;

first and second comparators each having a first input connected to said first ID voltage, the first comparator having a second input connected to said first reference voltage and the second comparator having a second input connected to the second reference voltage;

the first comparator having a first output if said ID voltage is above said first reference voltage and a second output if said ID voltage is below said first reference voltage;

the second comparator having a first output if said ID voltage is below said second reference voltage and a second output if said ID voltage is above said second reference voltage;

a gate connected to the outputs of said first and second comparators for producing a battery enable control signal on detection of second output from both said first comparator and said second comparator and a battery disable signal on detection of said first outputs from both said first and said second comparator; and the first switch being operatively connected to the output signal from said gate, whereby the switch is responsive to said battery enable and disable signals to connect the battery to the output contacts only when the detected load resistance is in a range between said predetermined minimum and maximum values.

19. The battery pack as claimed in claim 18, further including a battery self-protection unit connected between said first and second contacts, the control unit having an input, an overdischarge output, an overdischarge switch controlling series connection of the battery to a load in a discharge mode and having a control input connected to the overdischarge output of the control unit.

20. The battery pack as claimed in claim 19, wherein the first switch is connected to the overdischarge switch for disabling the overdischarge switch if the load ID resistance is detected to be outside the predetermined range between the minimum and maximum values, the first switch having a control input connected to said gate output.

21. The battery pack as claimed in claim 19, wherein the first switch is connected in series with the overdischarge switch and is connected to the gate output signal to open if the detected load resistance is outside said range.

22. The battery pack as claimed in claim 20, wherein the self-protection control unit has a power input connected to a battery terminal and the first switch is connected between the battery terminal and the power input to the control unit, so as to turn off the control unit when the detected resistance is outside the predetermined range.

23. The battery pack as claimed in claim 20, wherein the first switch is connected between the overdischarge output and the control input of said overdischarge switch.

24. The battery pack as claimed in claim 21, wherein the switches are FETs.

25. The battery pack as claimed in claim 24, wherein the first and overdischarge switches comprise FET switches having source, drain, and gate terminals, and each FET switch has a parasitic diode connected across the source and drain terminals.

26. The battery pack as claimed in claim 18, wherein the first and second voltage references each comprise voltage divider circuits.

27. A battery protection circuit, comprising:
   a switch assembly including an input for receiving a control signal, said switch assembly controlling connection of a battery output to a load;
   a detector for detecting a resistance at a load terminal; and
   means for determining whether said resistance has a value of resistance between a predetermined maximum resistance value and a predetermined minimum resistance value and for generating said control signal in response to said determination, said control signal causing said switch to close if said determination is positive and to open otherwise, whereby said battery output is connected to said load only when the detected resistance is of a value between the predetermined maximum and minimum values.

28. The battery protection circuit of claim 27, wherein said means for determining comprises:
   first comparator for comparing the detected resistance to a predetermined maximum resistance value and for generating a first output signal indicative of such comparison;
   a second comparator for comparing the detected resistance to a predetermined minimum resistance value and for generating a second output signal indicative of such comparison; and
   second detector for receiving said first and second output signals and for generating said control signal in response thereto, said control signal causing said switch assembly to close if said first control signal indicates said detected resistance is less than said predetermined maximum resistance value and said second control signal indicates said detected resistance is greater than said predetermined minimum resistance value, and causing said switch assembly to open otherwise.

* * * * *